July 15, 1952  J H. H. OVERHOLSER ET AL  2,603,449
SEALING MEANS FOR VALVES
Filed April 30, 1946

Inventor
Morgan Sweeney
J. Homer H. Overholser
By Lyon & Lyon
Attorneys

Patented July 15, 1952

2,603,449

UNITED STATES PATENT OFFICE 2,603,449

SEALING MEANS FOR VALVES

J Homer H. Overholser and Morgan Sweeney, Los Angeles, Calif., assignors, by mesne assignments, to Air Valve, Inc., Burbank, Calif., a corporation of California Application April 30, 1946, Serial No. 666,117

5 Claims. (Cl. 251—103)

Our invention relates to sealing means for control valves, more particularly to sealing means for high pressure valves having a rotary or oscillating movement. Among the objects of our invention are:

First, to provide a sealing means which may be employed without change on either the intake or discharge sides of the valve.

Second, to provide a sealing means which is easily removed and replaced, economical of manufacture, and which makes possible a simple and economical valve, even though intended for severe and exacting use.

Third, to provide a sealing means which although effecting a fluid-tight seal even at high pressures offers a minimum of resistance to movement of the valve rotor.

Fourth, to provide a sealing means which incorporates a novel flexible diaphragm movable in such a manner that irrespective of whether the sealing means is located on the discharge or low pressure side of the valve, or on the intake or high pressure side thereof, an unbalanced pressure area is established urging the sealing element into sealing engagement with the valve rotor.

Fifth, to provide a sealing means which makes use in a novel manner of a sealing element of the type commonly known as the "O-ring."

With the above and other objects in view, reference is directed to the accompanying drawings, in which.

Figure 1:
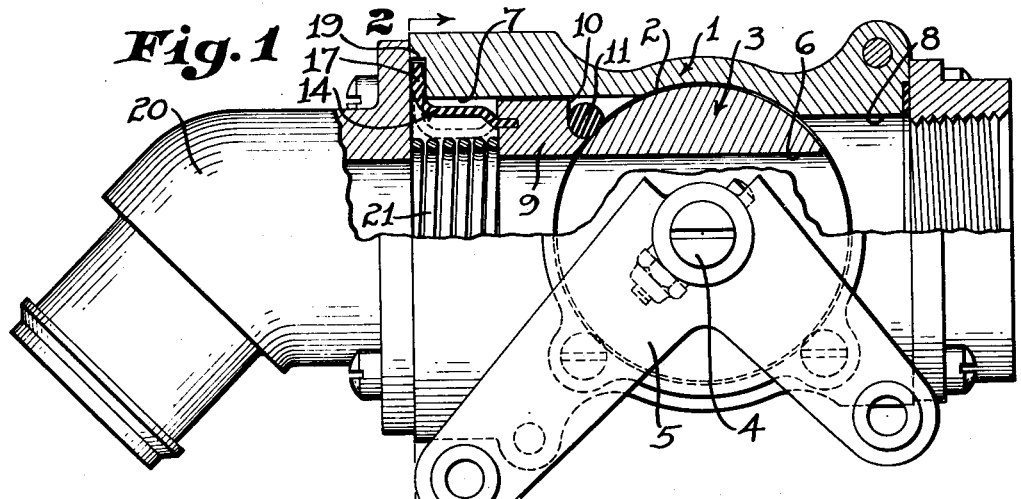
Figure 1 is a partial elevational, partial sectional view of a valve incorporating our sealing means.
Figure 2:
Figure 2 is an end view of the valve housing with the intake or discharge fitting as the case may be removed, exposing the sealing means, the view being taken along the plane 2—2 of Fig. 1.
Figure 3:
Figure 3 is an enlarged elevational view of our sealing means removed from the valve.
Figure 4:
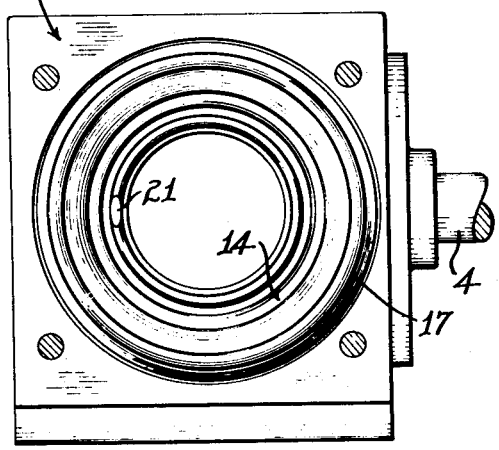
Figure 4 is a fragmental end sectional view thereof.
Figure 4:
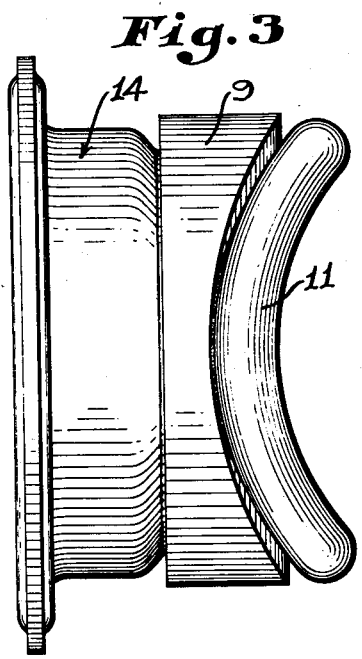
Figure 4:
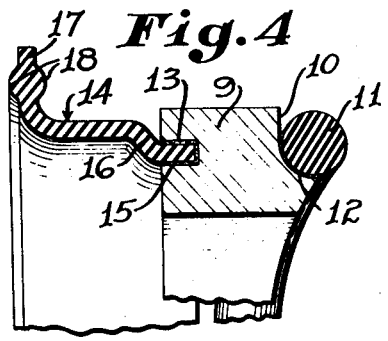

Our sealing means may be adapted for use in control valves of various types, i. e., control valves having one or several inlets and outlets. For purposes of illustration, however, a valve body having a single inlet and outlet is shown. The valve body 1 is provided with a rotor bore 2 which receives a rotor or core 3. The rotor is operated by a shaft 4 which extends axially therefrom and is provided with a handle 5. The rotor 3 is provided with a fluid passage 6, and the valve body defines passages 7 and 8 which intersect the rotor 3.

At least one of the valve body passages (e. g., passage 7) is greater in diameter than the rotor fluid passage 6 and is adapted to receive a mounting ring 9. One end of the mounting ring 9 confronts the rotor 3 and is shaped into conformity therewith. The outer margin of this end of the mounting ring is provided with an annular groove or shoulder 10 which follows the contour of the rotor 3. The groove 10 receives a sealing ring 11. The sealing ring 11 may be a conventional O-ring bent into conformity with the mounting ring and its groove. The O-ring is secured in the groove 10 by a suitable adhesive 12. The side of the O-ring confronting the rotor projects axially beyond the groove 10 a slight distance so that the sealing ring, rather than the mounting ring, forms the sealing connection with the rotor 3.

The axial end of the mounting ring 9 remote from the rotor 3 is provided with an annular axially directed recess 13 which receives one axial end of a tubular diaphragm 14. The diaphragm is held in the recess by an adhesive 15. On emerging from the mounting ring 9, the diaphragm 14 is flared, as indicated at 16, and then continues axially and terminates in a radial flange 17. The flange 17 is preferably provided on opposite sides with rudimentary annular ribs 18.

The flange 17 of the diaphragm is adapted to fit over an end of the valve body 1, preferably into a slight recess 19. Secured over this end of the valve body is an end fitting 20 which may constitute the inlet or discharge end of the valve, as desired. A spring 21 is interposed between the end fitting 20 and the mounting ring 9 within the diaphragm 14.

While only one of the valve passages is shown equipped with our fitting means, both passages may be so equipped and if there are more than one inlet or outlet, additional sealing means may be employed.

While metal may be employed for the mounting ring 9 it has been found extremely satisfactory to construct the ring from non-metallic material, such as one of the various plastics, a plastic being selected which does not react with the fluid which the valve is designed to control. The O-ring and the diaphragm 14 may be formed of rubber, or preferably of synthetic rubber, and by use of the plastic mounting ring many adhesives are available which bond both to the mounting ring and to the sealing ring or diaphragm. It has been found that extremely high pressure differentials may be effectively sealed by the sealing means. Furthermore a valve employing our sealing means has proven very successful in the handling of gasoline and similar liquids.

Operation of our sealing ring is as follows:

Assume, first, that the valve passage 7 is the intake passage and that the rotor 3 is in its closed position, in which passage 6 extends transversely to its position shown in full lines in Fig. 1. The internal static pressure of the supply fluid expands the diaphragm 11 into substantial conformity with the wall of the passage 7 and the end of the mounting ring 9. This establishes a pressure area effective to urge the mounting ring towards the rotor 3 and cause the sealing ring to maintain its sealing engagement. The spring 21 functions to insure the necessary initial seal. When the valve is open, the pressure on opposite sides of the mounting ring and diaphragm, due to clearance between the mounting ring and valve body, is equalized so that the only force on the mounting ring is that of the spring 21. Thus for all control positions of the valve there is a minimum load on the sealing ring.

If the passage 7 be the discharge side of the valve our sealing ring remains effective as a seal. In this case the static fluid pressure, by reason of the clearance space between the valve rotor and valve body, is applied behind or externally of the diaphragm 14, causing the diaphragm 14 to constrict around the spring 21. In so doing the axial end of the mounting ring forms a pressure area which is sufficient to establish an unbalanced force, urging the mounting ring against the rotor. It should be observed that the diameter of the sealing O-ring is slightly smaller than the mounting ring so that the pressure may be applied behind the mounting ring, a small bypass between the passage 8 and the back side of the mounting ring being thereby provided.

Thus it will be observed that the sealing means functions for its intended purpose whether or not it is located on the low pressure side or high pressure side of the valve body and may, therefore, be employed in installations where the valve must withstand a back pressure even though the sealing means be mounted in the normally high pressure side of the valve.

Many other embodiments of the invention may be resorted to without departing from the spirit of the invention.

We claim:

1. In a rotary valve: a valve body having inlet and outlet ports, and a rotor bore intersecting said ports at least one of said ports embodying a tubular wall of substantial axial extent; a rotor loosely mounted in said bore; a rigid mounting ring in said one port, loosely fitting said tubular wall, and shaped at its inner end to conform to the rotor periphery, a toroidal sealing ring secured to said inner end of the mounting ring and engaging said rotor periphery; a flexible tubular diaphragm one end of which is secured and sealed to said mounting ring and the other end of which is secured and sealed to the valve body around said one port, said diaphragm extending axially within said one port; and supporting means disposed within said diaphragm in radially spaced relation to said tubular wall and cooperating therewith to define an annular space of such radial dimension and location with reference to the area of sealing contact between said sealing ring and rotor as to provide for expansion and contraction of said tubular diaphragm between respective positions in which (a) in response to fluid pressure in said one port and inside said diaphragm it will expand to a greater diameter than said area of sealing contact, so as to establish an area of fluid pressure inside said diaphragm acting against the outer end of said mounting ring to press said sealing ring against said rotor, which area is greater than the area of fluid pressure acting against the inner end of said mounting ring within said area of sealing engagement, tending to unseat said sealing ring; and (b) in response to pressure in the other port bleeding past said rotor through said rotor bore into said one port and between said tubular wall and mounting ring and against exterior of said diaphragm, it will contract to a smaller diameter than that of said area of sealing contact, whereby to establish, in the space between said diaphragm and tubular wall, fluid pressure acting against the outer end of said mounting ring, to seat said sealing means, of greater magnitude than the fluid pressure acting against the inner end of said mounting ring outside said area of sealing engagement, tending to unseat said sealing ring, said tubular wall engaging and confining the diaphragm, when expanded, and said supporting means engaging and supporting said diaphragm, when contracted.

2. A rotary valve as defined in claim 1, including a fitting secured to the valve body at the end of said one port, and wherein said supporting means comprises a coil spring engaged under light compression between opposed ends of said fitting and mounting ring and maintaining sealing engagement of said sealing ring with said rotor in the absence of fluid pressure.

3. A valve as defined in claim 1, including a fitting secured to the valve body at the end of said one port, wherein said supporting means comprises a cylindrical coil spring engaged between opposed ends of said fitting and said mounting ring, and wherein said tubular diaphragm has at said other end a radially outwardly extending flange clamped and sealed between said fitting and said housing end.

4. A rotary valve as defined in claim 1, including a fitting secured to the valve body at the end of said one port, and wherein said tubular diaphragm has at its said other end a radially outwardly extending flange interposed under compression between said valve body and said fitting.

5. A valve as defined in claim 1, including a fitting secured to the valve body at the end of said one port, wherein said supporting means comprises a cylindrical coil spring engaged between opposed ends of said fitting and said mounting ring, and wherein said tubular diaphragm has at said other end a radially outwardly extending flange clamped and sealed between said fitting and said housing end, said mounting ring being of a plastic material and having an axially opening annular groove into which said one end of the tubular diaphragm is cemented, and said tubular diaphragm being of synthetic rubber material.

J HOMER H. OVERHOLSER.
MORGAN SWEENEY.

REFERENCES CITED

The following references are of record in the file of this patent:

UNITED STATES PATENTS

| Number | Name | Date |
|---|---|---|
| 2,191,232 | Heinen | Feb. 20, 1940 |
| 2,383,983 | Melichar | Sept. 4, 1945 |
| 2,390,201 | Bredenbeck | Dec. 4, 1945 |
| 2,404,816 | Snyder | July 30, 1946 |
| 2,417,400 | Snyder | Mar. 11, 1947 |
| 2,471,941 | Downey | June 7, 1949 |